United States Patent Office 2,945,832
Patented July 19, 1960

2,945,832

POLYVINYL CHLORIDE PLASTISOL CONTAINING AN ALKYLBIPHENYL AND ALKYL ESTER OF A DICARBOXYLIC ACID

Joachim Dazzi, Dayton, Ohio, assignor to Monsanto Chemical Company, St. Louis, Mo., a corporation of Delaware No Drawing. Filed June 5, 1957, Ser. No. 663,602

6 Claims. (Cl. 260—31.8)

This invention relates to synthetic resins and is particularly concerned with new and improved plastisol compositions made from vinyl resins.

The introduction of polyvinyl chloride supplied as fluid dispersions has resulted in new problems in plasticization. Dispersions of vinyl resins in a plasticizer as a solvent, commonly called plastisol compositions have been found to be subject to a viscosity increase when the composition is stored before use. The common plasticizers have been found to be impractical for the production of plastisols because of such viscosity build up as well as the high initial viscosity characteristic of such compositions because of their high solids content.

A plastisol as ordinarily made is a mixture of finely divided polymer dispersed in a plasticizer. The plasticizer component is mixed in proportions to give the desired properties for the particular resin. The resin does not dissolve completely in the plasticizer at room temperature, but may do so at higher temperature with the result that an organosol of the resin in the plasticizer mixture is obtained. The plastisol compositions are usually employed in a dip technique or are poured into a mold to make use of a slush casting technique. The mold or the dipped parts are then dried and subjected to a heating or fusion step such as by the use of hot air, radiant heat, dielectric or immersion heat. Upon cooling the polymer retains the shape of the mold or the dipping form.

In the manufacture of plastisols the plasticization apparently takes place through formation of a gel which can be regarded as a partial solution or dispersion of the polymer in the plasticizer. However, the product thus obtained differs from the usual polymer solutions since the plastisol gels must contain high concentrations of the plasticizer. Interaction between the polymer and plasticizer is considered in one theory to be due to Van der Waals forces, although other theories are based upon the formation of molecular compounds. However, regardless of the theory of plastisol structure, it is important that the plastisol be stable in order to give a good shelf life of the material before it is utilized in a forming step. Conventional plasticizers have not solved the difficulties in the compounding of plastisols because of the high viscosity and dilatancy which they impart to the mixture. Tricresyl phosphate, for example, while a good plasticizer in other circumstances, is characterized by a viscosity build-up when employed in plastisol compositions.

It has now been found that vinyl-type plastisols may be improved by the employment therein of an alkylbiphenyl in which the alkyl groups have from 2 to 4 carbon atoms such as ethylbiphenyl, a propylbiphenyl or a butylbiphenyl as a plasticizer component, together with a liquid ester-type plasticizer. The ester plasticizers contemplated are the esters having from 14 to 40 carbon atoms, such as methyl, ethyl, propyl, butyl, pentyl, hexyl, heptyl, octyl (including ethylhexyl), nonyl, decyl, undecyl, and dodecyl esters, and mixed esters, of phthalic, maleic, isophthalic, adipic and fatty acids. The esters may also be derived from phosphoric, phosphonic and sulfonic as well as arylalkylsulfonic acids. The alcohols employed may also include the homologous mixtures obtained by the Oxo process.

The proportion of the alkylbiphenyl, such as isopropylbiphenyl employed with the ester component (for example dioctyl phthalate) is in the weight ratio of from 1 to 15 parts by weight of the ester component plasticizer relative to the isopropylbiphenyl. The proportion of total plasticizer components is from 30% to 50% by weight of the plasticizers relative to the polyvinyl chloride.

The polyvinyl chloride employed in the present invention must be of a very finely-divided form. It has been found that excellent plastisol compositions are obtained when the polyvinyl chloride is employed as particles having size ranges of from 0.03 to 2.0 microns. Copolymers of polyvinyl chloride such as polymers of more than 80% vinyl chloride with other monomers such as vinyl acetate may also be employed.

Plastisols do not require a conventional solvent. However, it is sometimes desirable to prepare a relatively thin plastisol. Such compositions may be formulated with solvents like cyclohexanone, and the thickness of the composition adjusted by the use of a more volatile solvent such as acetone. The solids content may thus be adjusted in order to provide for various applications, for example, the coating of fabrics in order to provide an upholstery material for automobiles and furniture. A high solids product may also be prepared for use in slush molding or in dipping, for example, in the manufacture of water-proof gloves prepared with a fabric base. Another common application of dipping type plastisols is the coating of metal parts such as dish-racks and refrigerator hardware typical of household goods.

By way of illustration, suitable formulations are shown in the table below, which also lists the viscosity of the compositions.

FORMULATIONS

|  | 1 | 2 | 3 | 4 |
|---|---|---|---|---|
| Vinyl chloride, 0.05 to 0.15 microns size particles | 100 | 100 | 100 | 100 |
| Dioctylphthalate | 80 | 60 | 60 | 60 |
| Isopropylbiphenyl |  | 20 |  |  |
| Polyethylbenzene |  |  | 20 |  |
| Hydrogenated terphenyl (40% sat'd) |  |  |  | 20 |

VISCOSITY (poises), 23° C.

|  | 1 | 2 | 3 | 4 |
|---|---|---|---|---|
| Initial | 30 | 14 | 25 | 40 |
| 1 day | 36 | 18 | 31 | 54 |
| 7 days | 66 | 33 | 36 | 61 |
| 14 days | 84 | 32 | 38 | 58 |
| 28 days | 106 | 43 | 65 | 78 |

40° C.

|  | 1 | 2 | 3 | 4 |
|---|---|---|---|---|
| Initial | 22 | 15 | 21 | 34 |
| 1 day | 34 | 26 | 48 | 85 |
| 7 days | 70 | 39 | 61 | 86 |
| 14 days | 112 | 44 | 72 | 92 |
| 28 days | 104 | 48 | 100 | 146 |

50° C.

|  | 1 | 2 | 3 | 4 |
|---|---|---|---|---|
| Initial | 81 | 26 | 66 | 81 |
| 1 day | 950 | 62 | 400 | 950 |
| 7 days | >1000 | 256 | 870 | >1000 |
| 14 days |  | 408 | >1000 |  |
| 28 days |  | 858 |  |  |
|  |  | >1000 |  |  |

The above data show that isopropylbiphenyl when employed in plastisol compositions results in a low initial viscosity value, and also is characterized by relatively little increase in viscosity during storage.

What is claimed is:

1. A plastisol comprising polyvinyl chloride particles of from 0.03 to 2.0 microns diameter together with a combination plasticizer composed of an alkylbiphenyl in which the alkyl group has from 2 to 4 carbon atoms and an alkyl ester of a dicarboxylic acid, the ester having from 14 to 40 carbon atoms.

2. A plastisol comprising polyvinyl chloride particles of from 0.03 to 2.0 microns diameter together with a combination plasticizer composed of isopropylbiphenyl and an alkyl ester of a dicarboxylic acid, the ester having from 14 to 40 carbon atoms.

3. A plastisol comprising polyvinyl chloride particles of from 0.03 to 2.0 microns diameter and as a plasticizer therefor the combination of isopropylbiphenyl and an alkyl ester of a dicarboxylic acid having from 14 to 40 carbon atoms.

4. A plastisol comprising polyvinyl chloride particles of from 0.03 to 2.0 microns diameter plasticized with from 30% to 50% by weight, relative to the polyvinyl chloride, of a combination of isopropylbiphenyl and an alkyl phthalate ester having from 14 to 40 carbon atoms.

5. A plastisol comprising polyvinyl chloride particles of from 0.03 to 2.0 microns diameter plasticized with from 30% to 50% by weight, relative to the polyvinyl chloride, of a combination of isopropylbiphenyl and an alkyl phthalate ester having from 14 to 40 carbon atoms, the proportion of the said phthalate relative to the said isopropylbiphenyl being from 1 to 15 times.

6. A plastisol comprising polyvinyl chloride of from 0.03 to 2.0 microns diameter plasticized with from 30% to 50% by weight, relative to the said polyvinyl chloride of a combination of isopropylbiphenyl and dioctyl phthalate, the proportion of the said dioctyl phthalate being from 1 to 15 times as much as the said isopropylbiphenyl.

References Cited in the file of this patent

UNITED STATES PATENTS

| | | |
|---|---|---|
| 2,449,928 | Corkery | Sept. 21, 1948 |
| 2,567,719 | Loritsch | Sept. 11, 1951 |
| 2,600,122 | Meyer | June 10, 1952 |